Sept. 26, 1944.   P. F. HACKETHAL ET AL   2,359,265
PROPELLER
Filed May 10, 1941   7 Sheets-Sheet 1

Inventors
PAUL F HACKETHAL,
ARTHUR T. BRIGGS
AND GLENN T. LAMPTON
By Semmes, Keegin Beale & Semmes
Attorneys Sept. 26, 1944.  P. F. HACKETHAL ET AL  2,359,265
PROPELLER
Filed May 10, 1941  7 Sheets-Sheet 2

Inventors
PAUL F. HACKETHAL,
ARTHUR T. BRIGGS &
GLENN T. LAMPTON
By Semmes, Keegin Beale & Semmes
Attorneys

Sept. 26, 1944.  P. F. HACKETHAL ET AL  2,359,265
PROPELLER
Filed May 10, 1941   7 Sheets-Sheet 5

Inventors
PAUL F. HACKETHAL,
ARTHUR T BRIGGS AND
GLENN T LAMPTON
By Semmes, Keegin, Beale & Semmes
Attorneys Sept. 26, 1944. P. F. HACKETHAL ET AL 2,359,265
PROPELLER
Filed May 10, 1941 7 Sheets-Sheet 6

Inventors
PAUL F. HACKETHAL,
ARTHUR T. BRIGGS AND
GLENN T. LAMPTON
By Semmes, Keegin, Beale & Semmes
Attorneys Sept. 26, 1944.   P. F. HACKETHAL ET AL   2,359,265
PROPELLER
Filed May 10, 1941   7 Sheets-Sheet 7

Inventor
PAUL F. HACKETHAL
ARTHUR T. BRIGGS
AND GLENN T. LAMPTON
By Semmes, Keegin & Semmes
Attorneys Patented Sept. 26, 1944

2,359,265

UNITED STATES PATENT OFFICE 2,359,265

PROPELLER

Paul F. Hackethal, Baltimore, Md., Glenn T. Lampton, Williamsport, Pa., and Arthur T. Briggs, Baltimore, Md., assignors to Everel Propeller Corporation, Baltimore, Md., a corporation of Maryland Application May 10, 1941, Serial No. 392,966

7 Claims. (Cl. 170—162)

This invention relates to an automatic variable pitch propeller and more particularly to a propeller in which the propeller blades automatically assume the requisite pitch angles under all flight conditions.

In this connection it is well known that, for maximum performance, an airplane requires that the propeller-engine combination deliver the maximum possible propelling thrust under all flight conditions. The available power from the engine will largely determine this propelling thrust and the amount of this power is dependent largely upon the rotative speed of the engine. However, this engine speed is subject to limitations which are imposed by the engine manufacturers to insure endurance and reliability.

Under the foregoing conditions, it is well known that a fixed pitch propeller permits an airplane engine at full throttle operation to increase several hundred revolutions per minute between zero velocity, i. e. static take-off and the level flight velocity of the airplane. Therefore, the use of a propeller of fixed pitch design necessitates a compromise by which neither full engine revolutions per minute is available at take-off nor can full throttle operation be used at level flight velocity. The latter limitation is imposed by the requirement that the rated revolutions per minute of the motor not be exceeded for an extended period.

It has furthermore been recognized that the performance of an airplane as equipped with a fixed pitch propeller may be substantially improved by employing a propeller in which the pitch of the blades may be altered in flight. Heretofore, this variation has been accomplished by utilizing mechanisms in which the blades are variably pivoted. In previous mechanical arrangements the pitch is varied by either an automatic governing means or by remote manual control of the operator. Although the operation of devices of this type has been thoroughly satisfactory from an aero-dynamic viewpoint and several types are in widespread use, these automatic or controlled propellers are in general, heavy, costly and intricate and require more or less skilled attention from the pilot.

For these reasons a number of attempts have been made to design a propeller in which the desired variation in the pitch of the pivoted blades can be attained by utilizing the forces acting upon the blade itself. The advantages of such an arrangement are substantial because the propeller may be light and inexpensive, the hub requires no mechanism other than pivot bearings for the blade and alteration of the engine and additional accessories and cockpit controls are unnecessary and the propeller requires no attention from the pilot. However, previous attempts to provide a propeller of this type have been totally unsuccessful or at best only partially successful because of a failure to utilize to the greatest advantage the forces available and to take cognizance of all significant factors involved so as to manufacture a propeller of a suitable mechanical design.

One of the objects of this invention is to overcome the above enumerated disadvantages of the prior art.

Another object of this invention is to provide a propeller, the desired most efficient pitch of the blades of which is automatically obtained at any flight condition.

A further object of this invention is to provide a propeller that will adjust itself entirely automatically to all flight conditions that may effect the propeller under a virtually constant engine speed at a fixed throttle setting.

Still another object of this invention is to provide a propeller of the type described which will result in increased safety of the aircraft upon which it is installed by reason of the completely automatic attainment of superior performance.

Yet another object of this invention is to provide a propeller in which the blades are freely, pivotally mounted on the hub with the gravity axis of each blade inclined to its pivoting axis, whereby the forces acting on the blades automatically move the blades along the arc of a cone until the forces are in equilibrium and the blades assume the most efficient pitch at any flight condition.

A further object of this invention is to provide a propeller of the type described, employing a conventional propeller blade, the aerodynamic and centrifugal characteristics of which are known, by determining the angular relationships between the several elements.

Still a further object of this invention is to provide a counterweighted propeller using a conventional propeller blade, the aerodynamic and centrifugal characteristics of which are known, by pivotally mounting the blade upon a hub, determining the angle of inclination of the gravity axis of the blade with respect to the pivoting axis of the blade, determining the mass of the counterweight and the length of the counterweight arm and the angle between the arm and a reference line on the blade, assembling the blade in the hub at the proper inclination and attaching the appropriate mass of counterweight to the blade at the correct angle with respect to the blade.

With these and other objects in view, this invention comprises a propeller in which the desired or most efficient pitch of the inclined pivoted blade is attained automatically under any given operating condition by rotation of the blades responsive to the forces acting thereupon until the forces are in equilibrium.

As hereinbefore indicated, the blades of the propeller contemplated by this invention are freely pivotally mounted on the propeller hub in such a manner that the gravity axis of each blade is inclined with respect to the pivoting axis of the blade. The angle of inclination of the blade gravity axis to the blade pivot axis is referred to as the construction angle. It is apparent, therefore, that as the blade rotates it pivots along the arc of a cone, the apex of which falls at the point of intersection of the blade gravity axis and the pivot axis. As the blade rotates about the pivot axis the gravity axis passes through an angle about the pivot axis which is referred to as the pivoting angle. A typical automatically adjustable variable pitch propeller with which the present invention is concerned is disclosed in the application of P. F. Hackethal, Serial Number 333,239, filed May 3, 1940.

The distance between the center of the propeller drive shaft and the point of intersection of the blade gravity axis and the pivot axis is referred to as the construction distance. This distance is fixed by mechanical design considerations.

A propeller blade is set in the hub at an angle with respect to the plane of rotation of the hub. This angle is defined by the minor principal axis of a reference blade section normal to the blade gravity axis and the plane of rotation and is referred to as the pitch angle. The minor principal axis of a blade section is that axis lying in the plane of and passing thru the center of gravity of the section with respect to which the moment of inertia of the section is least. This axis is in general nearly parallel to the chord of the blade section. When the propeller blade pivots as described above, the projection of the gravity axis on a plane normal to the pivoting axis defines a varying angle with the plane of rotation. This angle is referred to as the pivoting angle. The angle between the projections of the minor principal axis of the reference blade section and the blade gravity axis on a plane perpendicular to the pivot axis is referred to as the phase angle. For practical purposes the phase angle is equivalent to the sum of the pivoting angle and the pitch angle since the angle between the plane of a reference blade section and the plane perpendicular to the pivot axis is small. Simply stated the phase angle is the angle between the blade and a plane containing both the blade gravity and pivoting axes.

The operation of an automatic variable pitch propeller of the type described above depends entirely upon the establishment of an equilibrium between the aerodynamic moments, which tend to decrease the pitch of the blades, and the summation of the blade and counter-weight centrifugal moments, which tend to increase the pitch of the blades, under any operating condition.

The principal feature of the invention resides in assembling a conventional propeller blade in the hub of a propeller of the type described at the proper construction angle. The construction angle is determined from the expressions of the forces acting on the blade which are in equilibrium, for at least two flight conditions. An analysis of these expressions results in a range of values for both the construction angle and the phase angle. From the ranges of the values for these angles a suitable construction may be selected. The angle selected must result in values for the blade shank bending moment below the maximum allowable bending moment.

Since, in practice, equilibrium at desired pitch angles between aerodynamic and centrifugal moments may require some modification of the mass distribution of the propeller blade, it is desirable to secure a counterweight to the blade shank. The counterweight is carried by an arm which is attached to the blade shank in the proper angular relation. The angle between counterweight arm and the minor principal axis of a reference blade section normal to the blade gravity axis is referred to as the counterweight phase angle.

Inasmuch as the counterweight moment must be in equilibrium with the remaining forces acting on the propeller blades, the expressions for these various forces in equilibrium will include that for the counterweight effect. From an analysis of such expressions for at least two flight conditions it is possible to determine the mass of the counterweight, the length of the counterweight arm, and the angular relation of the counterweight arm with respect to the minor principal axis of a blade section.

In practicing this invention, it is assumed that the design of a propeller blade must be based largely upon aerodynamic and stress considerations and therefore the design cannot be greatly modified without detrimental effects. It is, consequently, assumed that a suitable blade has been designed by well established methods for variable pitch operation and that its physical dimensions and aerodynamic characteristics are known either by experiment or by calculation. It is also assumed that the characteristics of the engine and airplane to be used with the blade are known.

For purposes of illustration, it is also assumed that the centers of gravity of all blade sections lie on a straight line and that the axis of the blade bearings is radial and perpendicular to the axis of rotation of the propeller crank shaft. If there is any departure from these conditions, a modification of the following method to take care of the additional factors will be required. The general method of attack, however, remains the same.

In the drawings the notations used in Figure 1 may be defined as follows:

$\phi$=construction angle—between the gravity axis of the blade and the pivot axis.
$\theta$=pivoting angle—between the plane of rotation and the projection of the gravity axis of the blade on a plane perpendicular to the pivot axis.
$\beta$=pitch angle—between the minor principal axis of a blade section and the plane of rotation.
$\gamma$=phase angle=$\theta+\beta$ (approximate).
$h$=construction distance.
$R-h$=distance along the blade gravity axis from the pivot axis.
$R_1$=nominal total radius of propeller blade (crankshaft to tip when perpendicular to crankshaft).

Figure 3:
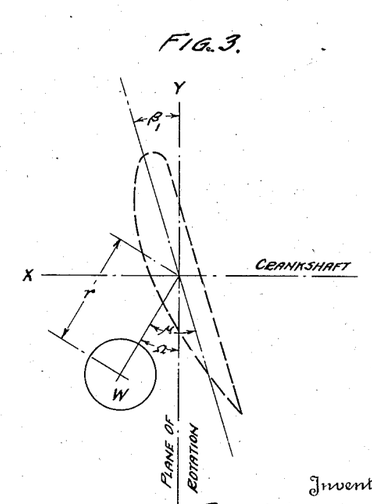
Figure 3 diagrammatically discloses the arrangement and notation of the counterweight for the blade shank.

As the propeller which forms the basis of this invention depends for its operation upon the establishment of an equilibrium between aerodynamic and centrifugal moments, ordinarily some modification of the mass distribution of the blade is desirable. This can most readily be accomplished by the addition of a counterweight to the blade shank as schematically shown in Figure 3. The general arrangement and notations used in this figure of the drawings have the following definitions:

$W$=weight of counterweight.
$r$=radius of counterweight c. g. from the pivot axis.
$\Omega$=angle between $r$ and the plane of rotation.
$\mu$=phase angle of counterweight=$\Omega+\beta$.

The aerodynamic moment of the propeller is a complex function of propeller speed, airplane speed, and propeller pitch and can be readily expressed only in graphical or tabular form. The centrifugal moment, on the other hand, has the following form:

$$M_c = KN^2 \sin 2\,(\beta_1+\psi)$$

Where $K$=constant.
$N$=propeller speed
$\beta_1$=propeller blade pitch angle
$\psi$=constant For the above reasons the design for a propeller, in which can be established an equilibrium between aerodynamic and centrifugal moments, can be based only on two specific combinations of airplane speed and engine speed. However, it has been established by both experiment and calculation that, if the propeller is designed for the desired characteristics under static takeoff and level flight, the intermediate characteristics will be generally improved.

The necessary condition for equilibrium of the propeller blade under all operating conditions is that the sum of the moments about the blade pivot axis be equal to zero as expressed by the following equation:

(1) $\quad \Sigma M_z = M_a + M_c + M_w + M_f = 0$

Where $M_a$=aerodynamic moment
$M_c$=centrifugal moment of blade
$M_w$=centrifugal moment of counterweight
$M_f$=frictional moment of blade bearing, which is positive or negative depending upon the instant direction of pivoting, or tendency toward pivoting, of the blade.

To enhance the operation of the propeller it is desirable to avoid hysteresis and reduce the frictional moment of the blade bearing ($M_f$) to a minimum by employing the proper design of the bearings in which the blade is mounted and by increasing the magnitude of the other moments. In this connection, the effect of engine vibration and torque impulses are such as to keep the bearings in slight motion, thereby decreasing the actual friction. Neglecting the frictional moment ($M_f$) for the above reasons, Equation 1 becomes (2) $\quad M_a + M_c + M_w = 0$ Considering pitch decreasing moments positive and pitch increasing moments as being negative, the terms of the above equation may be analyzed as follows:

*Aerodynamic moments*

The aerodynamic moment ($M_a$) about the blade pivot axis involves not only thrust and torque but the distribution of the aerodynamic pressures. The propeller torque can be readily obtained from the known characteristics of the selected engine and may, therefore, be considered constant for full throttle operation, and independent of engine speed for purposes of calculation. The propeller thrust can be calculated from published data concerning similar propellers by well known methods or based upon actual tests of the blade in question. The thrust is, of course, the function of blade pitch, speed of revolution of the propeller, and air speed.

For purposes of convenience the aerodynamic moments ($M_a$) on the blade will be resolved into the thrust and torque components, and these moments will be considered separately. A complete mathematical analysis to determine the distribution of aerodynamic pressures on the blade is possible but would be of doubtful accuracy. In the following calculations the center of pressure of the thrust and torque forces is assumed to be at 75% of the blade radius and 30% of the chord from the leading edge of the blade. Experimental data shows that these assumptions are not greatly in error.

Figure 1:
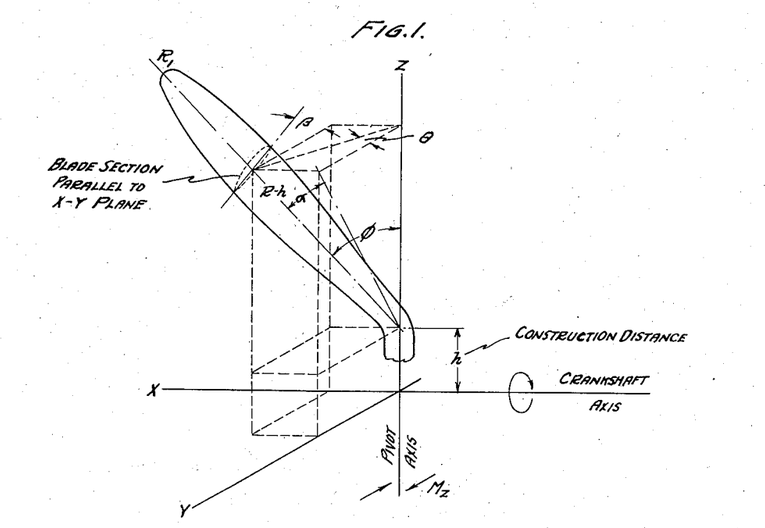
Figure 1 diagrammatically discloses the arrangement and notation of a propeller blade.

Referring to Figure 1, it can be seen that the moment due to thrust ($M_t$) about the blade pivot axis, Z, is:

(3) $M_t = T[(.75R_1 - h) \sin \phi \cos(\gamma - \beta_{75\%}) - m \cos \beta_{75\%}]$ Where $T$ = thrust per blade
$R_1$ = nominal total radius of propeller blade
$\gamma = \beta_{75\%} + \theta$ prox.
$m$ = distance from axis of blade to the center of pressure
$\beta_{75\%}$ = angular pitch at 75% station The propeller torque is obtained from the known engine characteristics and the torque force on the blade is $$F_q = \frac{Q}{.75R_1}$$

Where $Q$ = torque per blade.

Again referring to Figure 1, the moment of the torque force about the blade pivot axis, Z, is:

(4) $M_q = -F_q[(.75R_1 - h) \sin \phi \sin(\gamma - \beta_{75\%}) + m \sin \beta_{75\%}]$

Blade centrifugal moments

The centrifugal moment of a body about an axis perpendicular to the axis of its rotation can be shown to be:

(5) $$M = 4\pi^2 n^2 I_{xy}$$

Where $n$ = revolutions per second
$I_{xy}$ = product of inertia about the moment axis $z$.

Figure 2:
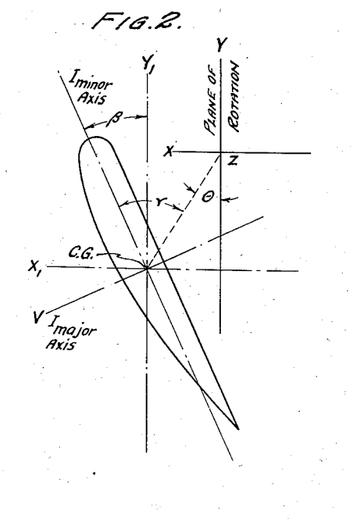
Figure 2 diagrammatically discloses a section of the blade disclosed in Figure 1, normal to the blade gravity axis.

As shown in Figure 2, a lamina of the blade may be taken perpendicular to the blade pivot axis Z and having the principal center axes U and V, the axis U making the angle $\beta$ with the plane of rotation. If $X_c$ and $Y_c$ shown in Figure 2 are the coordinates of the center of gravity of the lamina, it can be shown that the product of inertia of the lamina about Z is $$dI_{xy} = \frac{\rho}{2g}(I_v - I_u) \sin 2\beta dR - \frac{A\rho}{g} X_c Y_c dR$$

Where $\rho$ = density of blade material
$I_v$ and $I_u$ = principal moments of inertia of the lamina in inches$^4$ and since $X_c = r \sin \theta$
$Y_c = r \cos \theta$
$r = (R-h) \sin \phi$ (See Figure 1)

the above relation may be expressed as follows:

$$dI_{xy} = \frac{\rho}{2g}(I_v - I_u) \sin 2\beta dR - \frac{A\rho}{2g} \sin^2 \phi \sin 2\theta (R-h)^2 dR$$

The centrifugal moment of the entire blade is then from Equation 5.

(6) $$M_c = 2\pi^2 n^2 \frac{\rho}{g} \int_h^{R_1} (I_v - I_u) \sin 2\beta dR - 2\pi^2 n^2 \frac{\rho}{g} \sin^2 \phi \sin 2\theta \int_h^{R_1} (R-h)^2 A dR$$

Ordinarily, the principal moments of inertia of a blade section which is perpendicular to the blade axis are known. Therefore, since the angle $\theta$ is in all cases small, it can be assumed without serious error that $I_v$ and $I_u$ are equal to these known moments of inertia. Consequently, the first integral in the Equation 6 may be recognized as the expression for the centrifugal torsion of a radial blade. The mechanical integration has usually been performed as part of the blade stress analysis, for several different pitches of the blade, and the results take the form:

$$T_c = K_1 n^2 \sin(\psi + \beta_{75\%})$$

Where $K_1$ and $\psi$ are derived constants, and $\beta_{75\%}$ is the angular pitch at the 75% station.

Similarly, if the known blade areas perpendicular to the blade axis are assumed equal to the corresponding areas cut by planes normal to the pivot axis the integral $$\int_h^{R_1} (R-h)^2 A dR$$

may be evaluated mechanically and since $$\theta = \gamma - \beta_{75\%}$$

Equation 6 can now be written—

(7) $M_c = K_1 n^2 \sin 2(\varphi - \beta_{75\%}) - K_2 n^2 \sin^2 \phi \sin 2(\gamma + \beta_{75\%})$ In this connection it should be noted that the above constants $K_1$, $\varphi$, and $K_2$ define properties of the propeller blade which in general are fixed by aerodynamic and strength considerations foreign to the present discussion. Likewise, the angular pitch $\beta_{75\%}$ is fixed by the specified flight conditions, i. e. airplane speed, airplane and propeller blade characteristics, engine speed and horsepower. Therefore, only the construction angle, $\phi$, and the angle $\gamma$ are subject to variation for design purposes.

Counterweight moment

The counterweight moment ($M_w$) which is derived from Equation 5 will be $$M_w = 4\pi^2 n^2 I_{xy}$$

In this connection, if the weight of the counterweight arm is ignored and the counterweight is considered as a cylinder with its axis parallel to the pivot axis and at a distance $r$, from the pivot axis as is shown in Figure 3, the product of inertia is $$I_{xy} = \frac{Wr^2}{2g} \sin 2(\mu - \beta_{75\%})$$

and the counterweight moment is (8) $$M_w = \frac{2\pi^2 n^2}{g} Wr^2 \sin 2(\mu - \beta_{75\%})$$

where $r$=length of counterweight arm
$W$=weight of counterweight
$\mu$=counterweight phase angle
$\beta_{75\%}$=angular pitch of blade at 75%

If the required counterweight moments and the corresponding speeds are known for two positions of the blade, then $$M'_w = \frac{2\pi^2(n')^2}{g} Wr^2 \sin 2(\mu - \beta'_{75\%})$$

$$M''_w = \frac{2\pi^2(n'')^2}{g} Wr^2 \sin 2(\mu - \beta''_{75\%})$$

and (9) $$Wr^2 = \frac{gM''_w}{2\pi^2(n'')^2}\sqrt{1 + \left[\cot 2(\beta'' - \beta') - \left(\frac{M'_w}{M''_w}\right)\left(\frac{n''^2}{n'^2}\right)\csc 2(\beta'' - \beta')\right]^2}$$

Blade shank bending moments

It is convenient to consider the blade shank bending moments in the thrust and torque components separately. Referring to Figures 1 and 2, these components are (10) $$M_x = .75R_1 T - 4\pi^2 n^2 \frac{p}{g} \sin \phi \sin(\gamma - \beta_{75\%}) \int (R-h)RA\,dR$$

and (11) $$M_y = .75R_1 F_q - 4\pi^2 n^2 h \frac{p}{g} \sin \phi \int RA\,dR$$

The total bending moment may be expressed (12) $$M_b = (M_x^2 M_y^2)^{1/2}$$

It will be apparent from the expressions for the various forces acting on the propeller blade and their relationship to one another that, given a specific blade, the manufacturer has under his control:

(a) the construction angle $\phi$
(b) the blade phase angle $\gamma$
(c) the counterweight magnitude $Wr^2$
(d) the counterweight phase angle $\mu$
(e) the construction distance $h$ The construction distance is in general fixed by the mechanical design of the hub.

It is the purpose of these calculations to determine a combination of the above factors that will conform to the desired speed regulation characteristics. The selection of the proper combination is, however, subject to the following limitations:

(a) The blade shank bending moment must not exceed a predetermined limit to avoid excessive shank stresses and excessive eccentric loading of the blade pivot bearings.

(b) The counterweight magnitude $Wr^2$ must be within reason to avoid excessive weight and bulk.

(c) The construction angle $\phi$ must be as large as possible to keep the operating moments large with respect to the friction moment.

To determine the factors necessary to construct a propeller of the type described, the manufacturer may fix upon two conditions, such as zero velocity, i. e., static take-off and level flight velocity at full throttle, and compute or otherwise determine the following factors for each condition:

$V$=Air speed of plane
$n$=Rotative speed of propeller
$\beta_{75\%}$=Angular pitch of blade at 75% station
$T$=Thrust per blade
$Q$=Torque per blade And from the physical dimensions of the blades and hub:

$R_1$=Nominal radius of propeller
$m$=Chordal location of center of pressure
$h$=Construction distance
$\varphi, K_1, K_2$=Constants in centrifugal moment formula The substitutions of these values in Equations 3, 4, and 5 result in expressions for the thrust, torque and centrifugal moments in which $\gamma$ and $\phi$ are the only unknowns. The counterweight moments is by Equation 2.

$$-M_w = M_t + M_q + M_c$$

The systematic substitution of various pairs of $\gamma$ and $\phi$ in the moment equations result in the corresponding counterweight moments $M_w'$ and $M_w''$ for each flight condition and by Equation 8 the counterweight magnitude $Wr^2$ for each pair of $\gamma$ and $\phi$ is determined. The results are best displayed by plotting curves of constant $Wr^2$ on coordinates of $\gamma$ and $\phi$.

From the physical dimensions of the blade, the blade shank bending moments for each of the two flight conditions may be determined from Equations 10, 11, and 12 as a function of $\gamma$ and $\phi$, and a systematic substitution of various pairs of $\gamma$ and $\phi$ result in the two bending moments for each pair. The results are best displayed as curves of constant bending moment (corresponding to the allowable bending moment) on coordinates of $\gamma$ and $\phi$. It is convenient to place both the bending moment and $Wr^2$ curves on the same sheet.

The two curves of the maximum allowable bending moment and the curve of maximum desirable $Wr^2$ will then define a field from within which a suitable set of $\gamma$, $\phi$, and $Wr^2$ may be chosen, bearing in mind that $\phi$ should be kept large.

In a specific application of the method of manufacturing an automatic variable pitch propeller, the procedure followed in determining the structural relations between the hub and Lycoming hollow steel blades No. SO 220806 in a Waco S biplane, Jacobs L 5 engine combination will be given. The specific figures given here are merely for the purpose of illustration, in order to demonstrate one concrete application of the above method.

The above blades are nominally designed for eight feet, six inch diameter but are set one inch into the hub to give a diameter of approximately eight feet, four inches. The data curves in Figures 5, 6, 7 and 8 are corrected to this diameter. The construction distance $h$ between the intersection of the blade gravity axis and the pivot axis and the crankshaft axis is 2.5 inches. The maximum allowable bending moment at the blade shank is taken as 12,500 inch pounds. The maximum counterweighting is taken as 6 pounds at 5 inches radius or a $Wr^2$ of 150 pounds in$^2$.

The following two flight conditions are used as basis for determining the structural relations:

| | Flight condition No. | |
|---|---|---|
| | 1 | 2 |
| Flight condition | Take-off run | Level flight |
| Air speed __________ M. P. H. | 40 | 140 |
| Throttle | Full | Full |
| Engine speed __________ R. P. M. | 2150 | 2050 |
| Engine H. P. | 300 | 292 |
| Engine torque | 732 | 747 |
| Superscript used | 0' | 0'' |

Figure 4:
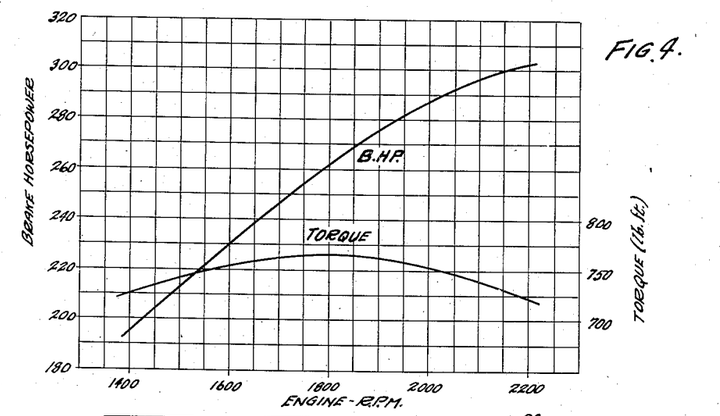
Figure 4 is the full throttle power diagram for the Jacobs L5 engine.

The 40 M. P. H. low air speed was chosen instead of the static condition because the computation for thrust may be made with better accuracy and, in this case the low pitch stop will be used to limit the static engine speed. The power figures are taken from the full throttle power curve of the engine, Figure 4.

Figure 5:
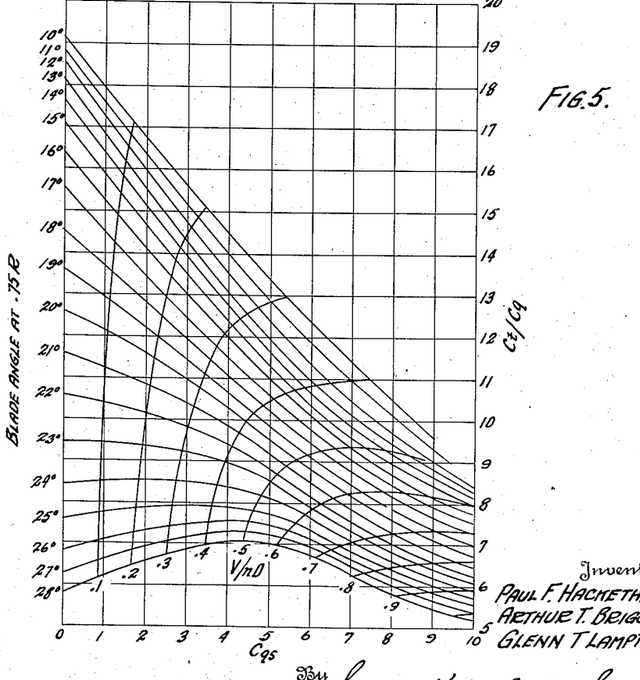
Figure 5 is the performance chart of a conventional propeller blade.

The aerodynamic thrust is computed from data for a similar propeller given in N. A. C. A. Report No. 481. Figure 5 is reproduced from Figure 12 of Report No. 481. The total thrust is estimated as being 5% greater than the effective thrust, $T_e$.

$$C_{q_s} = V\sqrt{\frac{\rho D^5}{Q}} \qquad T_e = \frac{C_t}{C_q} \cdot \frac{Q}{D}$$

| | | |
|---|---|---|
| Air speed __________ M. P. H. | 40 | 140 |
| V fps | 58.7 | 205.0 |
| D ft | 8.33 | 8.33 |
| n rps | 35.8 | 34.2 |
| V/nD | .197 | .72 |
| $\rho$ lb. ft.$^{-4}$ sec$^2$ | .00238 | .00238 |
| Q lb. ft. | 732 | 747 |
| $C_{qs}$ | 2.55 | 8.82 |
| $C_t/C_q$ | 13.4 | 7.25 |
| $T_e$ lb | 1180 | 650 |
| $T=1.05\ T_e$ lb | 1240 | 680 |
| T per blade | 620 | 340 |

The propeller torque equals engine torque and taking the resultant force at .75R,

| | | |
|---|---|---|
| Air speed | 40 | 140 |
| Torque Q lb. ft. | 732 | 747 |
| R | 4.165 | 4.165 |
| $F_q = \frac{Q}{2x.75R}$ lb. per blade | 117 | 120 |

Figure 6:
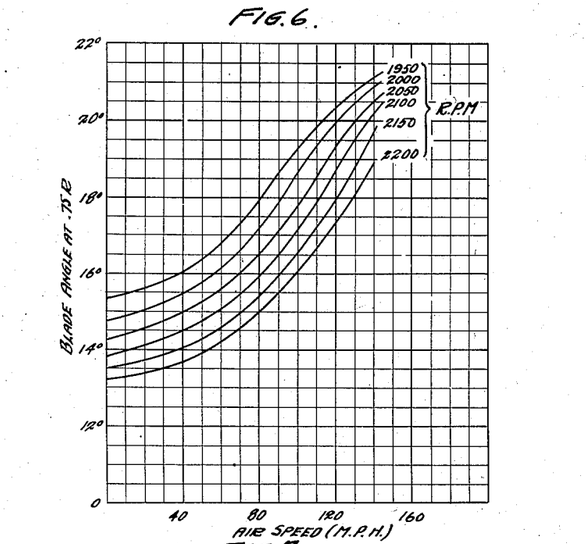
Figure 6 is a flight test diagram of Waco S ship employing the particular engine of Figure 4 and propeller blade of Figure 5.

The angular pitch of the blades may be read from the curves in Figure 5. However, flight test data is available for these blades on this airplane-engine combination. The results are displayed in Figure 6. From these curves:

| | | |
|---|---|---|
| V(M. P. H.) | 40 | 140 |
| N(R. P. M.) | 2150 | 2050 |
| $\beta_{75\%}$ deg | 14.1 | 20.5 |

Referring to Equation 3, the thrust moment is:

$$M_t = T[(.75R - h)\sin\phi\cos(\gamma - \beta_{75\%}) - m\cos\beta_{75\%}]$$

$M_t$ = Thrust moment in inch lbs.
T = Thrust per blade in lbs.
R = Propeller radius in inches = 50
h = Construction distance = 2.5 inches
$\phi$ = Construction angle in degrees
$\gamma$ = Phase angle in degrees
$\beta_{75\%}$ = Angular pitch at .75% station
m = Distance of center of pressure from blade axis = 1.16 inches.

Hence in lb. inches $M'_t =$
$620[(.75 \times 50 - 2.5)\sin\phi\cos(\gamma - 14.1) - 1.16\cos 14.1]$ $M''_t =$
$340[(.75 \times 50 - 2.5)\sin\phi\cos(\gamma - 20.5) - 1.16\cos 20.5]$ $M'_t = 21700 \sin\phi\cos(\gamma - 14.1) - 694$ $M''_t = 11900 \sin\phi\cos(\gamma - 20.5) - 369$

Torque moments

Referring to Equation 4, the torque moment is $$M_q = F_q[(.75R - h)\sin\phi\sin(\gamma - \beta_{75\%}) + m\sin\beta_{75\%}]$$

$M_q$ = Torque moment in lb. inches
$F_q$ = Torque force in lbs.

Hence in lb. inches $M'_e =$
$117[(.75 \times 50 - 2.5)\sin\phi\sin(\gamma - 14.1) + 1.16\sin 14.1]$ $M''_e =$
$120[(.75 \times 50 - 2.5)\sin\phi\sin(\gamma - 20.5) + 1.16\sin 20.5]$ $M'_e = -[4090\sin\phi\sin(\gamma - 14.1) + 33]$ $M''_e = -[4200\sin\phi\sin(\gamma - 20.5) + 49]$

Centrifugal moments

Referring to Equation 6, the centrifugal moment is:

$$M_c = 2\pi^2 n^2 \frac{\rho}{g}\int_h^R (I_v - I_u)\sin 2\beta\, dR - 2\pi^2 n^2 \frac{\rho}{g}\sin^2\phi\sin 2(\gamma - \beta_{75\%})\int_h^R (R-h)^2 A\, dR$$

Figure 7:
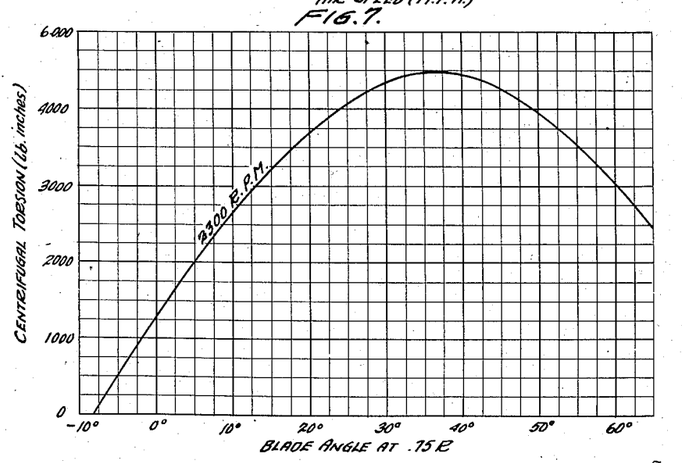
Figure 7 is the centrifugal torsion diagram at 2300 R. P. M. for the blade, the characteristics of which are set forth in Figure 5.

The first term in the above equation has been recognized as centrifugal torsion of a radial blade. This has been computed by the blade manufacturer for 2300 R. P. M. Figure 7 displays the results.

| Air speed __________ M. P. H. | 40 | 140 |
|---|---|---|
| $\beta_{75\%}$ | 14.1 | 20.5 |
| N (R. P. M.) | 2150 | 2050 |

From the curve

Centrifugal torsion =

$$4500\left(\frac{60n}{2300}\right)^2 \sin 2(\beta_{75\%} + 8.5)\ \text{lb. in.}$$

Figure 8:
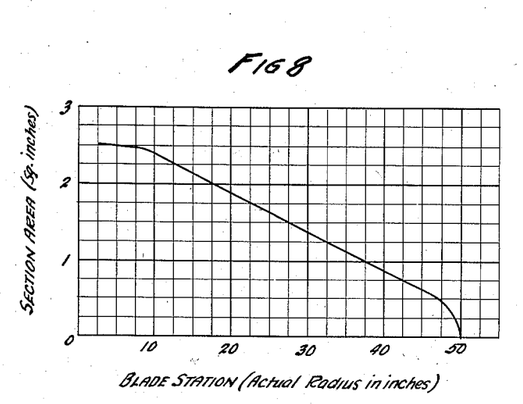
Figure 8 is a diagram of blade section areas of the propeller blade in Figure 5.

Mechanical integration using the blade section areas taken from the manufacturers stress analysis and shown by the curve disclosed in Figure 8, gives the value of the integral in the second term.

$$\int_h^R (R-h)^2 A\, dR = \int_{2.5}^{50}(R-2.5)^2 A\, dR = 34{,}560\ \text{inches}$$

and the second term (multiplied by $\frac{1}{12}$ to express the equation in inch units)

$$\frac{1}{12} 2\pi^2 n^2 \frac{\rho}{g}\sin^2\phi\sin 2(\gamma - \beta_{75\%}) \cdot 34{,}560 =$$

$$500 n^2 \sin^2\phi\sin 2(\gamma - \beta_{75\%})$$

Hence in lb. inches.

$$M'_e = 4500\left(\frac{60 \times 35.8}{2300}\right)^2 \sin 2(14.1 + 8.5) -$$
$$500 \times 35.8^2 \sin^2\phi\sin 2(\gamma - 14.1)$$

$$M''_e = 4500\left(\frac{60 \times 34.2}{2300}\right)^2 \sin 2(205 + 8.5) -$$
$$500 \times 34.2^2 \sin^2\phi\sin 2(\gamma - 20.5)$$

$$M'_e = 2790 - 633{,}000\sin^2\phi\sin 2(\gamma - 14.1)$$

$$M''_e = 3025 - 586{,}000\sin^2\phi\sin 2(\gamma - 20.5)$$

Counterweight moment and $Wr^2$

Referring to Equation 2, the counterweight moments are:

$$M'_w = -[M'_t + M'_c + M'_s]$$

$$M''_w = -[M''_t + M''_c + M''_s]$$

By Equation 8

$$Wr^2 = \frac{M''_w}{.0511(n'')^2}\sqrt{1+\left[\frac{M'_w}{M''_w}\left(\frac{n''}{n'}\right)^2 \csc 2(\beta''-\beta') - \cot 2(\beta''-\beta')\right]^2}$$

$$= \frac{M''_w}{.0511 \cdot 34.2^2}\sqrt{1+\left[\frac{M'_w}{M''_w}\cdot\frac{34.2^2}{35.8} \csc 2(20.5-14.1) - \cot 2(20.5-14.1)\right]^2}$$

$$= .01676 M''_w\sqrt{1+\left(4.11\frac{M'_w}{M''_w}-4.402\right)^2}$$

The phase angle $\mu$ of the counterweight arm is:

$$\cot 2(\mu - 20.5) = 4.11\frac{M'_w}{M''_w} - 4.402$$

Shank bending moments

Referring to Equation 12, the blade shank bending moment is $$M_b = \sqrt{\left[.75RT - \frac{\pi^2 \rho n^2}{3g}\sin\phi \sin(\gamma-\beta)\int R(R-h)AdR\right]^2 + \left[.75RF_a - \frac{\pi^2\rho n^2 h}{3g}\sin\phi\int RAdR\right]^2}$$

By mechanical integration using values of $A$ from Figure 8.

$$\int RAdR = 1509 \text{ in}^4$$
$$\int R(R-h)AdR = 38,160 \text{ in}^5$$

|  |  | Condition | |
|---|---|---|---|
|  |  | 1 | 2 |
| Torque: |  |  |  |
| Q | lb. in. | 4,592 | 4,482 |
| n | rps | 35.8 | 34.2 |
| Thrust: |  |  |  |
| T | lb. | 620 | 340 |
| ρ | lb./in.³ | .283 |  |
| h | inches | 2.5 |  |
| R | do. | 50 |  |
| β | degrees | 14.1 | 20.5 |

$$M'_b = \sqrt{[21,700 - 1,413,000 \sin\phi \sin(\gamma-14.1)]^2 + [4100 - 139,700 \sin\phi]^2}$$

$$M''_b = \sqrt{[11,900 - 1,290,000 \sin\phi \sin(\gamma-20.5)]^2 + [4185 - 127,800 \sin\phi]^2}$$

Capitulation

OPERATING MOMENTS $$M'_t = 21700 \sin\phi \cos(\gamma-14.1) - 694$$

$$-M'_c = 4090 \sin\phi \sin(\gamma-14.1) \, 33$$

$$M'_s = 2790 - 633,000 \sin^2\phi \sin 2(\gamma-14.1)$$

$$-M'_w = M'_t + M'_c + M'_s$$

$$M''_t = 11,900 \sin\phi \cos(\gamma-20.5) - 369$$

$$-M''_c = 4200 \sin\phi \sin(\gamma-20.5) \, 49$$

$$M''_s = 3025 - 586,000 \sin^2\phi \sin 2(\gamma-20.5)$$

$$-M''_w = M''_t + M''_c + M''_s$$

$$Wr^2 = .01676 M''_w\sqrt{1+\left(4.11\frac{M'_w}{M''_w}-4.402\right)^2}$$

Shank bending moments $$M'_b = \sqrt{[21,700 - 1,413,000 \sin\phi \sin(\gamma-14.1)]^2 + [4100 - 139,700 \sin\phi]^2}$$

$$M''_b = \sqrt{[11,900 - 1,290,000 \sin\phi \sin(\gamma-20.5)]^2 + [4185 - 127,800 \sin\phi]^2}$$

Preliminary exploratory calculation indicates that the useful values of the phase angle $\gamma$ and the construction angle $\phi$ should fall within the range $$16° < \gamma < 28°$$
$$0° < \phi < 10°$$

Figure 9:
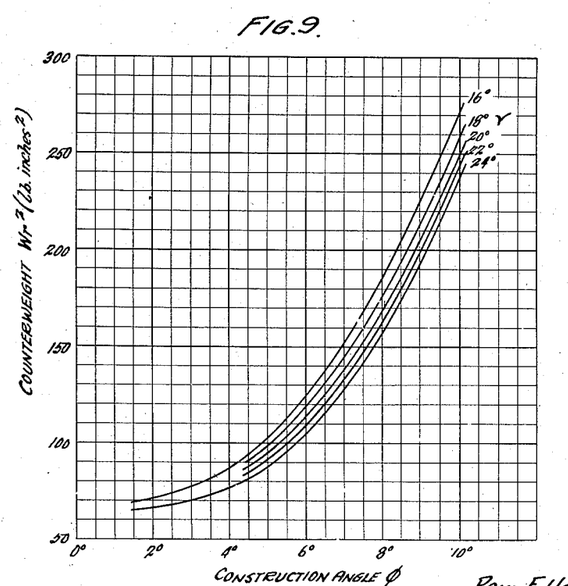
Figure 9 is a graphical representation of the relation of the range of magnitude of the counterweight with respect to various values of construction and phase angles, which is derived from the expressions for the forces acting on the blade for two flight conditions.

The counterweight magnitude $Wr^2$ is then computed for several different values of $\gamma$ and $\phi$ within this range using all possible pairings. The labor may be greatly reduced by graphical interpolation observing that functions of the sines of small angles are virtually straight lines. The result of these computations for $Wr^2$ are shown in Figure 9.

Figure 10:
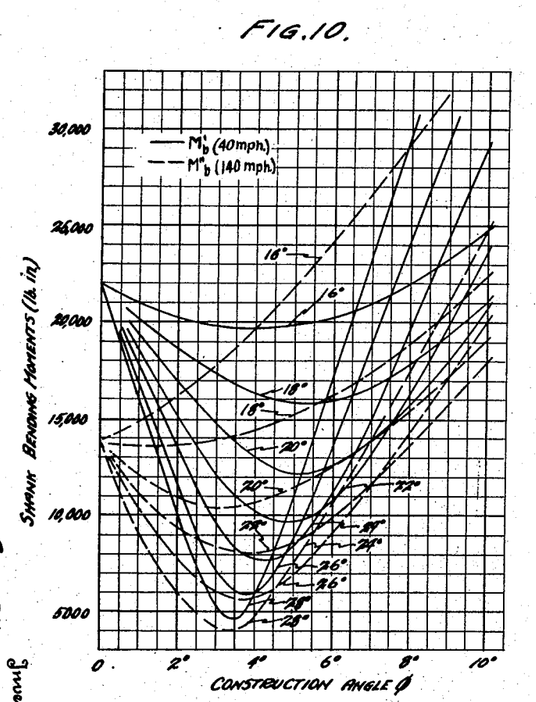
Figure 10 is a graphical representation of the relation between the blade shank bending moments with respect to various values of construction and phase angles for two flight conditions.

Similarly the shank bending moments for each design condition are systematically computed for various pairings of $\gamma$ and $\phi$. The results are shown in Figure 10.

Figure 11:
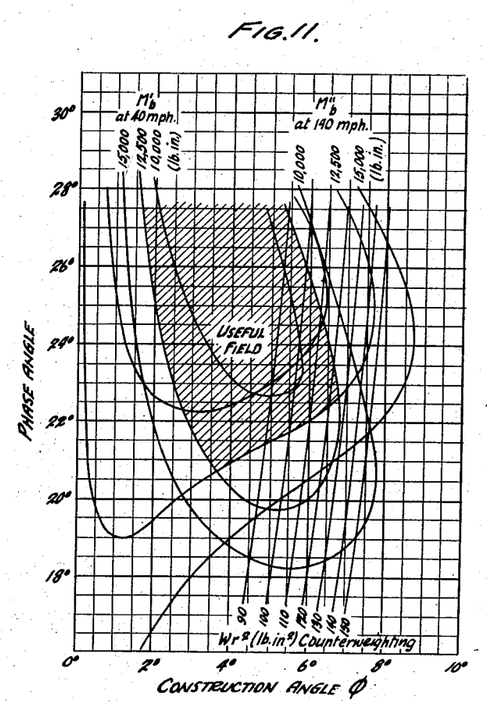
Figure 11 is a composite graph comprising first, the relation of the values of the counterweight magnitude with respect to various values of construction and phase angles and secondly, the relation of the allowable blade shank bending moments with respect to various values of construction and phase angles.

Using values read from the above curves several values of $Wr^2$ are plotted upon coordinates of $\gamma$ and $\phi$, and curves corresponding to the allowable bending moments for the two design conditions are plotted upon the same sheet as is disclosed by Figure 11.

The curves of constant shank bending moment define the useful field of values of $\gamma$ and $\phi$ and the $Wr^2$ may be read for any such pair. It may be noted that the assumed upper limit of $Wr^2 = 150$ does not enter the useful field. If it had it would have become part of the boundary of that field.

The choice of a suitable $\gamma$ and $\phi$ is now somewhat limited. To minimize the effects of bearing friction the construction angle should be large, thus resulting in relatively large aerodynamic moments. This consideration alone would lead to the choice of $\phi = 6.8°$ and $\gamma = 22.5°$ and results in a $Wr^2$ of approximately 125 lb. in².

Mechanical design considerations result in the choice of a construction angle of $\phi = 6.2$ and using a counterweight arm of 5 inches from the curves Figure 11.

$$\phi = 6.2°$$
$$\gamma = 23°$$
$$W = 4.52\# \text{ at } 5'' \text{ radius}$$
$$M'_b = M''_b = 11,250 \text{ lb. in. at 40 and 140 M. P. H.}$$

The improved stability and speed regulation of a propeller manufactured according to the above method may be demonstrated theoretically.

Because of the difficulty in expressing the aerodynamic forces on a propeller blade in the form of a mathematical equation with fixed coefficients, the demonstration of stability in a general form is not feasible. The regulation and stability of a specific propeller will, therefore, be used as an example. For this purpose the 300 horsepower steel bladed propeller, the design calculations of which are given above will be used. The same design conditions are used, namely; 2150 R. P. M. at 40 M. P. H., and 2050 R. P. M. at 140 M. P. H. both at full throttle. Only the full throttle characteristics will be considered.

The aerodynamic moments and the blade pitch for the two design conditions are determined by methods outlined above. For equilibrium under these conditions these aerodynamic moments must be respectively equal to the corresponding summation of the blade and counterweight centrifugal moments. Observing that the centrifugal moments can be expressed by $$M_c = K N^2 \sin 2 (\alpha + \beta)$$

where

K and $\alpha$ are constants
N = rotative speed
$\beta$ = angular blade pitch

An expression for the centrifugal moment as a function of rotative speed and pitch is derived by simultaneous solution of the above equation for the two design conditions as applied to the blade centrifugal moment and the counterweight centrifugal moment, with a view of deriving a net summation of the centrifugal blade and counterweight moments.

Figure 12:
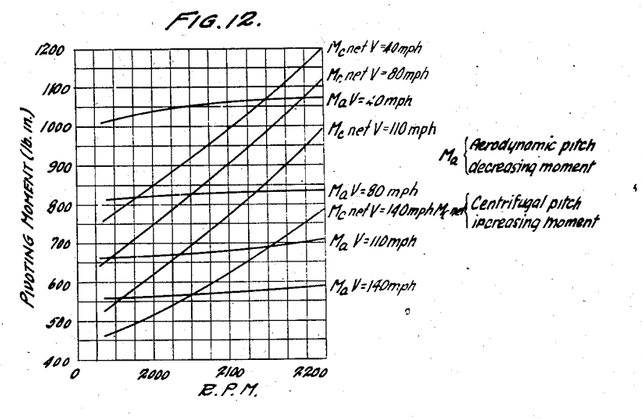
Figure 12 is a graphical analysis of the aerodynamic and centrifugal moments at different rotative speeds depicting the equilibrium of the propeller.

For any assumed air speed and rotative speed the blade pitch may be determined. The centrifugal moments may be computed and the net blade and counterweight centrifugal moment derived. The aerodynamic moment may also be computed for the same conditions. If for the assumed air speed the aerodynamic and net centrifugal blade and counterweight moments are computed for several rotative speeds and the two moments plotted against rotative speed, the intersection of the curves will indicate an equilibrium position, and consequently the equlibrium rotative speed for that particular air speed. Figure 12 displays the results of this procedure for several different air speeds.

Figure 13:
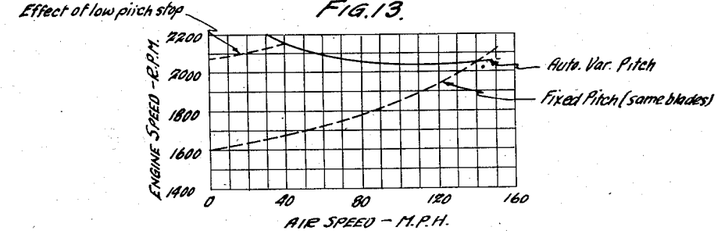
Figure 13 is a graphical representation of the speed regulation of the propeller of this invention derived from Figure 12.
Figure 14:
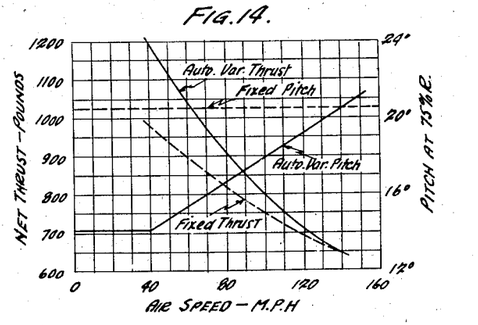
Figure 14 is a graphical representation of the approximate thrust and pitch at different air speeds of the propeller of this invention as compared with a fixed pitch propeller.
Figures 15, 16, 17, 18:
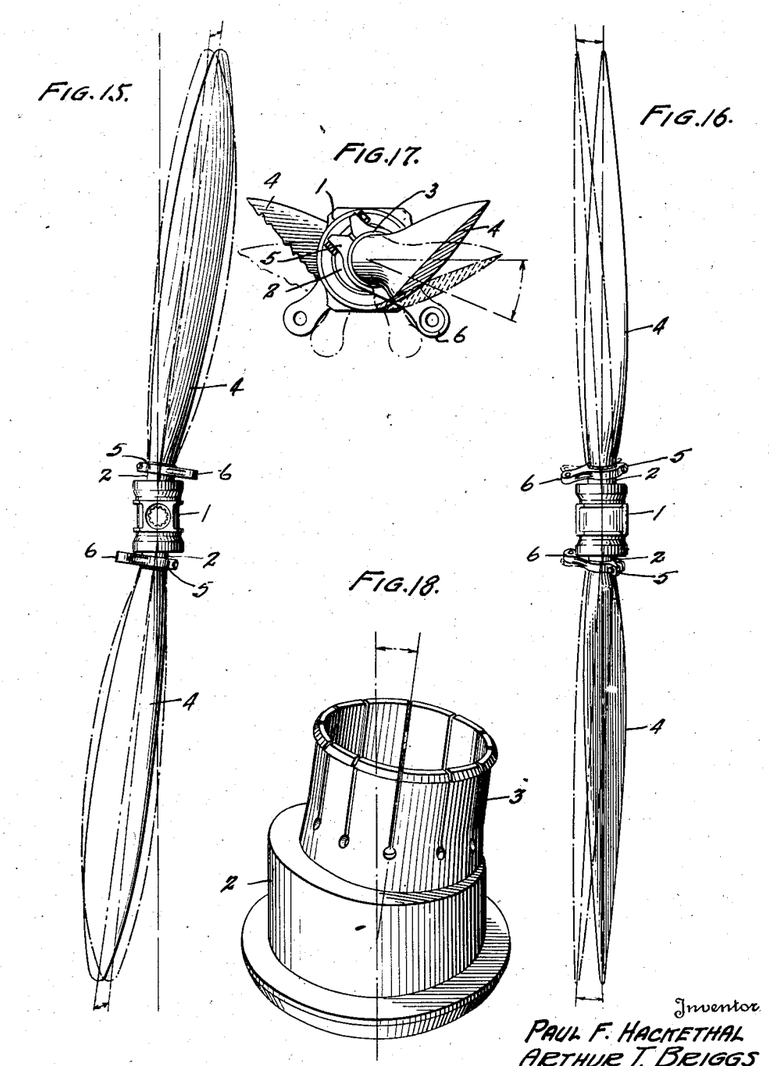
Figure 15 is a front elevation of a propeller constructed in accordance with the present invention, the solid outline indicating the position of the propeller blades at maximum pitch while the broken outline indicates the position of the propeller blades for minimum pitch.
Figure 16 is a side elevation of the propeller with the solid line indicating maximum pitch and the broken line indicating minimum pitch of the blades.
Figure 17 is a view partly in section illustrating the conical arcuate movement of the propeller blades to effect a variation in the pitch thereof.
Figure 18 is a perspective view of a sleeve utilized for mounting the shanks of the propeller blades in the hub of the propeller.

Figure 13 is the full throttle speed regulation curve derived from Figure 1, together with the curve of the speed regulation of a fixed pitch propeller using the same blades. Figure 14 displays the approximate thrust and pitches for different air speeds for both the propeller of this invention and a fixed pitch propeller.

Referring to Figure 12 where curves of aerodynamic and the net summation of centrifugal blade and counterweight moments are shown for different air speeds, it will be noted that equilibrium occurs at favorable rotative speeds for the several air speeds. To demonstrate stability refer to the 40 miles per hour curves: if the pitch is such as to result in 2,000 R. P. M. it is seen that the aerodynamic moment is in excess of the net centrifugal blade and counterweight moment $M_c$ net. As the aerodynamic moment is pitch decreasing the effect is to decrease the pitch resulting in increased engine speed, thus moving toward the equilibrium speed of 2,150 R. P. M. At a speed in excess of 2,150 R. P. M. the pitch increasing net centrifugal moment of the blade and the counterweight is larger and the resulting increase of pitch slows the engine to the equilibrium point. It is seen that similar conditions exist for other air speeds, thus demonstrating complete stability under the several conditions considered.

Referring to Figure 13, which is a curve of the equilibrium rotative speeds for various air speeds, it is evident that the regulation is favorable between the design conditions of 40 and 140 M. P. H. It appears from the trend of the curve that the rotative speed will not increase unduly at 170 M. P. H. which is the placarded speed of the ship for which the propeller is designed. This is borne out by flight test results. It may be noted that at air speeds below 40 M. P. H. the rotative speed may become excessive. This may be prevented by the low pitch stop which may be set to give a minimum pitch corresponding to the design speed at 40 M. P. H. Below this air speed the propeller will then act as one of fixed pitch resulting in decreased rotative speeds as the air speed is reduced as shown by the dotted line.

It should be noted that the curves for a similar fixed pitch propeller shown in Figures 13 and 14 are for a propeller pitched to give the same R. P. M. in level flight as the propeller of this invention. A fixed pitch propeller of a small pitch designed to give better take-off thrust would suffer at the higher air speeds because of the necessary throttling to prevent engine overspeeds.

This particular propeller should display satisfactory speed regulation and stability in full throttle flight. It is inferred that the operation would be equally satisfactory at other throttle openings and that other propellers of similar design would show similar results. This is borne out by actual flight tests with propellers ranging from 75 to 300 horsepower and with both steel and wooden blades. In all cases it has been possible to achieve the desired speed regulation and stability.

A propeller construction in accordance with the principles of the present invention is illustrated in Figures 15 through 18 and comprises a hub 1 for mounting on a drive or engine shaft. The hub is provided with a pair of radial recesses in which are mounted sleeves 2. A bore is provided in the sleeves the axis of which is inclined to the axis of the sleeve. A cuff-like flange 3 extends from the sleeve and cooperates with the bore in the sleeve to form a blade shank receiving socket. Blades 4 have shanks mounted and secured in the sockets and clamps 5 serve to maintain the angular relation between the blade shank and socket. Counter-weights 6 are carried by clamps 5. In the aforementioned application, Serial No. 333,239, constructional details are more fully set forth.

We claim:

1. An automatic engine-speed controlling propeller comprising a hub having an axis of rotation, means for mounting the hub on a propeller shaft with its axis of rotation fixedly coinciding with the axis of the propeller shaft, a blade pivotally mounted upon the hub with its pivoting axis fixed relatively to the axis of rotation of the hub, and with its blade gravity axis at a predetermined angle to the pivoting axis so that in pivoting, the blade describes the arc of a cone whose axis coincides with the pivoting axis, said blade having a predetermined phase angle with respect to a plane containing both the blade gravity and pivoting axes, and a counterweight exerting a predetermined moment upon the blade during rotation of said propeller, movement of said blade through said conical arc during rotation of the propeller being effected solely by pitch decreasing net aerodynamic and pitch increasing net centrifugal moments acting upon the blade assembly, and constant speed operation of said propeller being secured by having the sum of the thrust moment, the torque moment, the blade centrifugal moments, the counterweight centrifugal moment and the frictional moment acting on said blade about said pivoting axis equal to zero under at least two load conditions of propeller operation.

2. An automatic engine-speed controlling propeller comprising a hub having an axis of rotation, means for mounting the hub on a propeller shaft with its axis of rotation fixedly coinciding with the axis of the propeller shaft, a blade pivotally mounted upon the hub with its pivoting axis fixed relatively to the axis of rotation of the hub and with its blade gravity axis at a predetermined angle to the pivoting axis so that in pivoting, the blade describes the arc of a cone whose axis coincides with the pivoting axis, the point of intersection of said axes being spaced a predetermined distance from the axis of rotation of the hub, said blade being mounted for movement through a pivoting angle forward and rearward of the plane of rotation of the pivoting axis, said blade having a predetermined phase angle with respect to the plane containing both the blade gravity and pivoting axes, and a counterweight exerting a predetermined moment upon the blade during rotation of said propeller, movement of said blade through said conical arc during rotation of the propeller being effected solely by the pitch decreasing net aerodynamic and pitch increasing net centrifugal moments acting upon the blade assembly, and constant speed operation of said propeller being secured by having the sum of the thrust moment, the torque moment, the blade centrifugal moments, the counterweight centrifugal moment and the frictional moment acting on said blade about said pivoting axis equal to zero under at least two load conditions of propeller operation, and the distance of the point of intersection of said blade gravity and pivoting axes from the axis of rotation of the hub being such that together with said angles and magnitude of the counterweight force, the blade shank bending moment stresses are within the allowable stress limits of the blade.

3. An automatic engine-speed controlling propeller comprising a hub having an axis of rotation, means for mounting the hub on a propeller shaft with its axis of rotation fixedly coinciding with the axis of the propeller shaft, a blade pivotally mounted upon the hub and pivoting about an axis fixed relatively to and perpendicular to the axis of rotation of the hub, the gravity axis of the blade being inclined at a fixed predetermined angle to the pivoting axis of the blade so that in pivoting, the blade describes the arc of a cone whose axis coincides with the pivoting axis, said blade being so mounted that the projection of the minor principal axis of a blade section normal to the blade gravity axis on a plane perpendicular to the blade pivoting axis is at a predetermined angle to the projection of the blade gravity axis upon said plane perpendicular to the blade pivoting axis, and a counterweight of predetermined mass mounted on the blade and having an arm of predetermined length and positioned at a predetermined angle to the minor principal axis of the blade, movement of said blade through said conical arc during rotation of the propeller being effected solely by pitch decreasing net aerodynamic and pitch increasing net centrifugal moments acting upon the blade assembly, and constant speed operation of said propeller being secured by having the magnitude of the counterweight mass, the counterweight arm and the various angles such that the sum of the thrust moment, the torque moment, the blade centrifugal moments, the counterweight moment and the frictional moment acting on said blade about said pivoting axis equals zero under at least two load conditions of propeller operation.

4. An automatic engine-speed controlling propeller comprising a hub having an axis of rotation, means for mounting the hub on a propeller shaft with its axis of rotation fixedly coinciding with the axis of the propeller shaft, a blade carrying element rotatably mounted on said hub for pivoting about an axis perpendicular and fixed with respect to the axis of rotation of the hub, a blade carried by said element with its gravity axis inclined at a fixed predetermined angle to the pivoting axis of the blade carrying element, the intersection of said pivoting and gravity axes being at a predetermined distance from the axis of rotation of the hub, said blade being adjustably positioned in the carrying element to have a predetermined phase angle with respect to a plane containing both said gravity and pivoting axes, and a counterweight carried by the blade and offset a predetermined distance from said pivoting axis, the disposition of said counterweight being such that a line through its center of gravity and normal to the pivoting axis of the blade forms a predetermined angle to the minor axis of the blade, movement of the blade about said pivoting axis being effected solely by pitch decreasing net aerodynamic and pitch increasing net centrifugal moments acting upon the blade assembly during rotation of the propeller, and constant speed operation of said propeller being secured by having said various angles, distance and mass of the counterweight such that the sum of the thrust moment, the torque moment, the blade centrifugal moments, the counterweight centrifugal moment and the frictional moment acting on said blade about the pivoting axis equals zero under at least two flight conditions.

5. An automatic engine-speed controlling propeller for aircraft comprising a hub having an axis of rotation, means for mounting the hub on a propeller shaft with its axis of rotation fixedly coinciding with the axis of the propeller shaft, a blade pivotally mounted on the hub for pivoting about an axis perpendicular and fixed with respect to the axis of rotation of the hub and with its gravity axis inclined at a fixed predetermined angle to the pivoting axis of the blade, said blade being mounted for movement through a pivoting angle forward and rearward of the plane of rotation of the pivoting axis, said blade having a predetermined phase angle with respect to a plane containing both the blade gravity and pivoting axes, and a counterweight carried by the blade and offset a predetermined distance from the pivoting axis, the disposition of said counterweight being such that a line passing through its center of gravity and normal to the pivoting axis of the blade forms a predetermined angle to the minor principal axis of the blade, movement of said blade about its pivoting axis during rotation of the propeller being effected solely by pitch decreasing net aerodynamic and pitch increasing net centrifugal moments acting upon the blade assembly, said various angles, distance, weight and position of said counterweight being such that the sum of the thrust moment, the torque moment, the blade centrifugal moments, the counterweight centrifugal moment and the frictional moment acting on said blade about the pivoting axis equals zero under at least two load conditions of propeller operation and serves to maintain the rotary speed of the propeller substantially constant for a low forward speed of the aircraft during takeoff and to maintain the rotary speed of the propeller substantially constant but at a lower value during level flight.

6. An automatic engine speed controlling propeller comprising a hub having an axis of rotation, means for mounting the hub on a propeller shaft with its axis of rotation fixedly coinciding with the axis of the propeller shaft, a blade carrying element rotatably mounted on said hub for pivoting about an axis perpendicular and fixed with respect to the axis of rotation of said hub, a blade carried by said element with its gravity axis inclined at an angle $\phi$ to the pivoting axis of the blade carrying element so that in pivoting, the blade describes an arc of a cone whose axis coincides with the pivoting axis, the point of intersection of said blade gravity and pivoting axes being spaced a predetermined distance from the axis of rotation of the hub, and with the projection of the minor principal axis of a blade section normal to the blade gravity axis on a plane normal to the blade pivoting axis at an angle $\gamma$ to the projection of the blade gravity axis on said plane normal to the blade pivoting axis, and a counterweight of predetermined mass mounted on the blade and having an arm of predetermined length and positioned at the predetermined angle $\mu$ to the minor principal axis of the blade, movement of said blade through said conical arc during rotation of the propeller being effected solely by pitch decreasing net aerodynamic and pitch increasing net centrifugal moments acting upon the blade assembly and substantially constant speed operation of said propeller being secured by having the magnitude of the counterweight mass, the counterweight arm and the angles $\phi$, $\gamma$ and $\mu$ such that the sum of the thrust moment $$T\,[(XR_1-h)\sin\phi\cos(\gamma-\beta X\%)-m\cos\beta X\%]$$

the torque moment, $$-F_q[(XR_1-h)\sin\phi\sin(\gamma-\beta X\%)+m\sin\beta X\%]$$

the blade centrifugal moments, $$2\pi^2 n^2 \frac{\rho}{g}\int_h^{R_1}(I_v-I_u)\sin 2\beta dR -$$

$$2\pi^2 n^2 \frac{\rho}{g}\sin^2\phi\sin 2\theta\int_h^{R_1}(R-h)^2 A dR$$

and the counterweight centrifugal moment $$\frac{2\pi^2 n^2}{g}Wr^2\sin 2(\mu-\beta X\%)$$

is substantially equal to zero under at least two arbitrary flight conditions defined by air speed, engine speed and throttle setting, in which $\theta$=pivoting angle between the plane of rotation and the projection of the gravity axis of the blade on a plane perpendicular to the pivot axis $T$=thrust per blade
$R_1$=nominal total radius of propeller blade
$h$=distance between hub axis and point of intersection of blade axis with pivot axis
$\beta$=pitch angle between minor principal axis of a blade section and the plane of rotation
$m$=distance from axis of blade to center of pressure
$\rho$=density of blade material
$\gamma$=angle between the projection of the minor principal axis of the reference blade section and the blade gravity axis on a plane perpendicular to the pivoting axis of the blade, or $\theta+\beta$ (approximately)
$n$=revolutions per second
$g$=force of gravity
$I_v$ and $I_u$=principal moments of inertia of a selected lamina in inches$^4$
$r$=length of counterweight arm
$W$=mass of counterweight
$\beta X\%$=angular pitch at center of pressure
$A$=area of section
$\mu$=angle between counterweight arm and the minor principal axis of a blade section
$F_q$=torque per blade divided by $XR_1$ $$X=\frac{\text{distance from center of pressure to axis of rotation}}{R_1}$$

7. An automatic engine-speed controlling propeller comprising a hub having an axis of rotation, means for mounting the hub on a propeller shaft with its axis of rotation fixedly coinciding with the axis of the propeller shaft, a blade pivotally mounted upon the hub with its pivoting axis perpendicular and fixed relatively to the axis of rotation of the hub, and with its blade gravity axis at a predetermined angle to the pivoting axis so that in pivoting, the blade describes the arc of a cone whose axis coincides with the pivoting axis, said blade being mounted for movement through a pivoting angle forward and rearward of the plane of rotation of the pivoting axis, said blade having a phase angle adjusted to a predetermined value with respect to a plane containing both the blade gravity and pivoting axes, and a counterweight exerting a predetermined moment upon the blade during rotation of said propeller, movement of said blade through said conical arc during rotation of the propeller being effected solely by pitch decreasing net aerodynamic and pitch increasing net centrifugal moments acting upon the blade assembly, and constant speed operation of said propeller being secured by having the sum of the thrust moment, the torque moment, the blade centrifugal moments, the counterweight centrifugal moment and the frictional moment acting on said blade about said pivoting axis equal to zero, under at least two load conditions of propeller operation.

PAUL F. HACKETHAL.
GLENN T. LAMPTON.
ARTHUR T. BRIGGS.

Certificate of Correction

Patent No. 2,359,265.   September 26, 1944.

PAUL F. HACKETHAL ET AL.

It is hereby certified that errors appear in the printed specification of the above numbered patent requiring correction as follows: Page 4, second column, line 51, in the equation, for "$(\varphi - \beta_{75\%})$" read $(\psi + \beta_{75\%})$; line 52, for "$(\gamma + \beta_{75\%})$" read $(\gamma - \beta_{75\%})$; line 54, for "$K_1, \varphi$" read $K_1, \psi$; page 5, second column, line 18, for "$\varphi, K_1$" read $\psi, K_1$; line 24, for the word "moments" read *moment;* page 6, second column, line 55, for "inches" read *inches$^5$*; page 10, second column, line 33, claim 6, in the equation, for "$R^{1}$" read $R_1$; and that the said Letters Patent should be read with these corrections therein that the same may conform to the record of the case in the Patent Office.

Signed and sealed this 23rd day of January, A. D. 1945.

[SEAL]

LESLIE FRAZER,
*Acting Commissioner of Patents.*